United States Patent
Drummond et al.

(10) Patent No.: US 10,697,173 B2
(45) Date of Patent: Jun. 30, 2020

(54) SPECIALIZED CONNECTION DEVICES AND METHOD OF USE

(71) Applicant: SR Systems, LLC, Tuscaloosa, AL (US)

(72) Inventors: Scott Drummond, Tuscaloosa, AL (US); Steve Zimmerman, Linden, AL (US); Van T. Walworth, Rockwood, TN (US); Tommy DuPuy, Huntsville, AL (US)

(73) Assignee: SR Systems, LLC, Tuscaloosa, AL (US)

( * ) Notice: Subject to any disclaimer, the term of this patent is extended or adjusted under 35 U.S.C. 154(b) by 0 days.

(21) Appl. No.: 16/036,492

(22) Filed: Jul. 16, 2018

(65) Prior Publication Data

US 2018/0371743 A1 Dec. 27, 2018

Related U.S. Application Data

(60) Provisional application No. 62/532,558, filed on Jul. 14, 2017.

(51) Int. Cl.
*E04B 1/41* (2006.01)
*F16B 43/00* (2006.01)
*F16B 5/02* (2006.01)

(52) U.S. Cl.
CPC .......... *E04B 1/4121* (2013.01); *E04B 1/4157* (2013.01); *F16B 43/00* (2013.01); *F16B 5/0275* (2013.01)

(58) Field of Classification Search
CPC .... E04B 1/4121; E04B 1/4157; E04B 1/4164; F16B 43/00; F16B 5/0275

(Continued)

(56) References Cited

U.S. PATENT DOCUMENTS 3,405,497 A * 10/1968 McNair ................. E04B 1/4121
  52/699
3,500,607 A * 3/1970 Wilson ................. E04B 1/4164
  52/699

(Continued)

FOREIGN PATENT DOCUMENTS

WO   2020018430   1/2020

OTHER PUBLICATIONS

International Search Report and Written Opinion for PCT Application No. PCT/US2019/041820, dated Oct. 31, 2019 12 pages.

*Primary Examiner* — Brent W Herring
(74) *Attorney, Agent, or Firm* — Schwegman Lundberg & Woessner, P.A.

(57) ABSTRACT

An anchor bolt fastener assembly with specialized connection capabilities and features for attaching building components to concrete slabs, walls, ceilings, and/or structural surfaces. Compression force can be established and maintained over time using a compression washer in combination with a specialized fastener stud that is designed to exploit the compression washer benefits. Methods of using exemplary embodiments include installing the anchor bolt fastener assembly relatively flush with the surface of the concrete slurry by direct insertion in the slurry using a specialized threaded anchor bolt float. Once the slurry hardens, the anchor bolt and anchor bolt float embedded in the concrete slurry cooperate with the specialized fastener stud to secure the building component to the concrete.

16 Claims, 7 Drawing Sheets

(58) Field of Classification Search
USPC ......... 52/698, 699, 295, 701, 704, 706, 707, 52/708
See application file for complete search history.

(56) References Cited

U.S. PATENT DOCUMENTS

| | | | | |
|---|---|---|---|---|
| 3,854,371 A * | 12/1974 | Lamothe | ................. | F16B 37/14 411/337 |
| 3,867,804 A * | 2/1975 | Wilson | ................. | E04B 1/4164 52/699 |
| 3,877,235 A * | 4/1975 | Hill | ................. | E21D 20/025 405/259.6 |
| 4,117,643 A * | 10/1978 | Lamothe | ............... | E04B 1/4164 29/264 |
| 4,198,798 A * | 4/1980 | Haydock | ............... | E04B 1/4164 52/699 |
| 4,211,048 A * | 7/1980 | Naka | ................. | E04B 1/4121 411/427 |
| 4,642,964 A * | 2/1987 | Kellison | ............... | E04B 1/4121 52/699 |
| 4,872,298 A * | 10/1989 | Klemic, Jr. | .......... | E04B 1/4157 52/127.1 |
| 4,932,818 A * | 6/1990 | Garwood | ............... | E04B 1/4157 411/107 |
| 4,945,704 A * | 8/1990 | Brown, Jr. | ............. | E04C 5/168 52/699 |
| 5,205,690 A * | 4/1993 | Roth | ................. | E04B 1/4121 411/180 |
| 5,404,689 A * | 4/1995 | Dinarda | ................. | E04B 1/4164 411/82 |
| 5,415,510 A * | 5/1995 | Funaki | ................. | E04G 17/0658 411/384 |
| 5,570,549 A * | 11/1996 | Lung | ................. | E04C 5/125 52/295 |
| 5,653,078 A * | 8/1997 | Kies | ................. | E04B 1/4121 52/698 |
| 6,240,697 B1 * | 6/2001 | Thompson | ............ | E04B 1/4121 52/698 |
| 7,520,102 B1 * | 4/2009 | diGirolamo | ........... | E04B 1/4157 52/293.1 |
| 8,201,381 B2 * | 6/2012 | Heath | ................. | E04B 1/4157 52/698 |
| 8,479,466 B2 * | 7/2013 | Roulston | ............... | E04B 1/4157 249/190 |
| 2005/0120665 A1 * | 6/2005 | Anderson, Jr. | ....... | E04B 1/2604 52/698 |
| 2009/0288356 A1 * | 11/2009 | Fitzpatrick | .............. | E02D 27/00 52/295 |
| 2014/0075878 A1 * | 3/2014 | Marshall | ................. | E04G 5/02 52/699 |
| 2014/0157717 A1 | 6/2014 | Espinosa | | |
| 2016/0252197 A1 * | 9/2016 | Roth | ................. | F16B 1/00 248/548 |
| 2017/0167130 A1 * | 6/2017 | Bellerive | ............... | E04B 1/4164 |

* cited by examiner

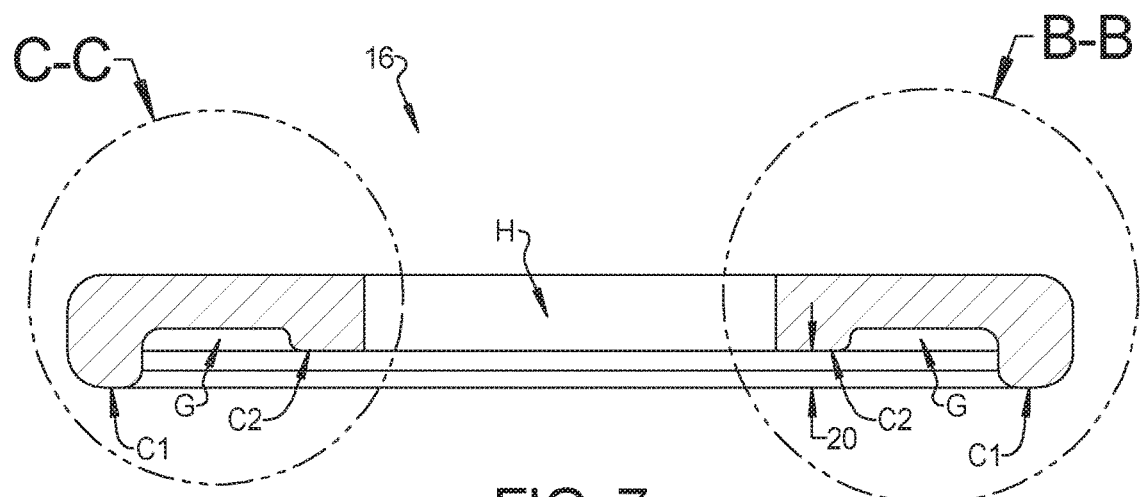
FIG. 7
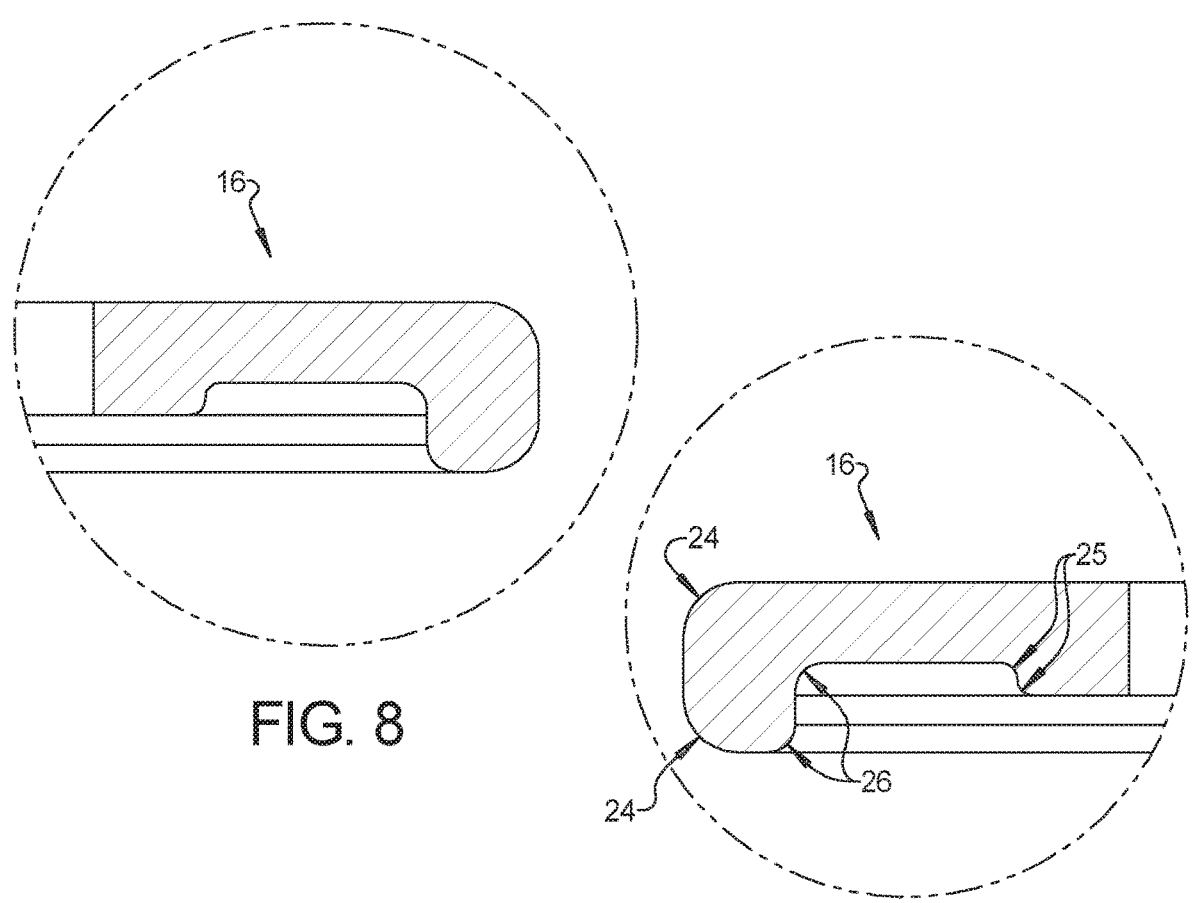
FIG. 8
FIG. 9

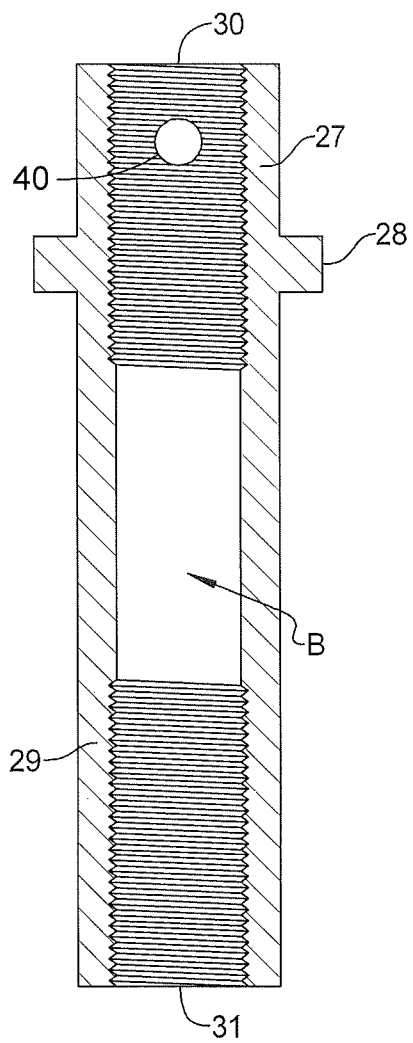
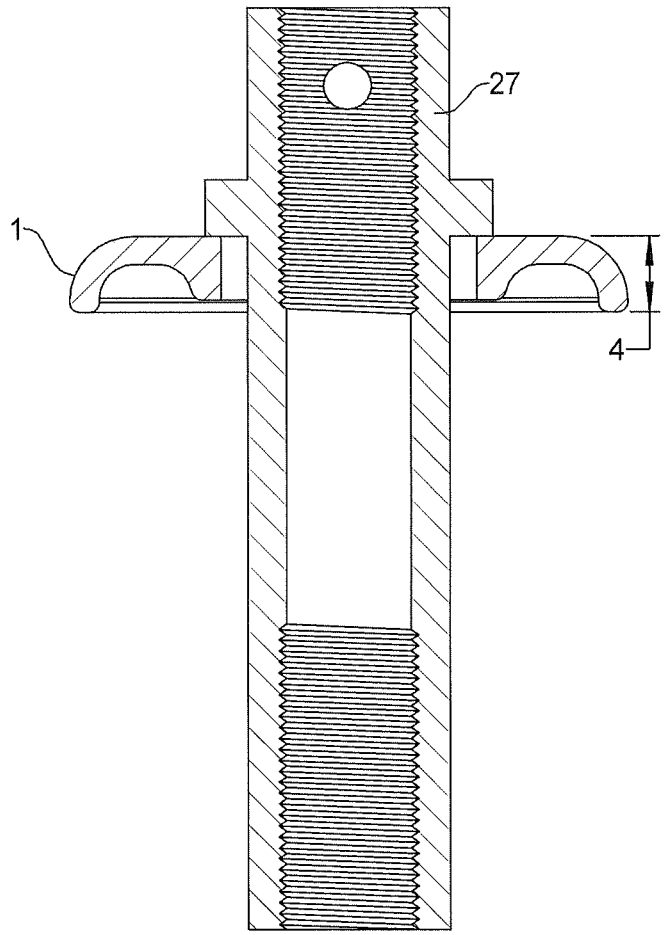
FIG. 10
FIG. 11

US 10,697,173 B2

SPECIALIZED CONNECTION DEVICES AND METHOD OF USE

CROSS-REFERENCE TO RELATED APPLICATIONS

This application claims the benefit of U.S. Provisional Application No. 62/532,558 filed Jul. 14, 2017 so that the entire disclosure of the above application is incorporated herein by reference.

FIELD

The subject disclosure generally relates to fasteners and anchoring systems used to secure structures or other components to concrete and/or similar foundation support structures.

BACKGROUND

This section provides background information related to the present disclosure which is not necessarily prior art.

Various anchoring systems and methods are commonly used in the construction industry to secure and fasten buildings to concrete and/or similar foundation support structures. One of the most common methods is the use of anchor bolts, which are embedded in concrete slurry before the concrete slurry is fully cured. Anchor bolts typically have a threaded portion and an unthreaded portion, which may be bent or L-shaped. During installation, the anchor bolts are embedded at orientations where the threaded portion of the anchor bolts protrude above the slurry surface. When the concrete has cured, construction elements of a building are then attached to the threaded portion of the anchor bolts. For example, wall constructions such as wood frame structures may be attached to anchor bolts. Typically, the 2×4 or 2×6 bottom plate of the wall is bolted to the anchor bolt, which typically passes through a hole in the bottom plate of the wall and is fastened with a nut and washer. As another example, structural beams may be bolted to anchor bolts.

SUMMARY

This section provides a general summary of the disclosure, and is not a comprehensive disclosure of its full scope or all of its features.

The present disclosure is directed to an improved anchor bolt fastener assembly, which includes an anchor bolt that is capable of being installed relatively flush with the concrete slurry so that it can cooperate with a fastener stud for securing a building to the concrete. The anchor bolt fastener assembly of the present disclosure includes an anchor bolt float that has a threaded bore at a first end of the anchor bolt float, an inner receiving chamber at a second end of the anchor bolt float, and an outer slurry contact surface disposed between the first and second ends. When the anchor bolt float is embedded in the concrete slurry, the second end of the anchor bolt float is configured to be generally oriented relatively flush with the surface of the concrete slurry while the first end of the anchor bolt float is configured to be generally submerged deep below the surface of the concrete slurry. This results in an improved anchor bolt fastener assembly with a threaded flush float that is oriented relatively flush with the grade of the slurry.

When the slurry is still wet after pouring, exemplary embodiments of the anchor bolt fastener assembly disclosed herein can be inserted into the slurry and positioned relatively flush with the surface grade of the slurry. This makes finishing the slurry easy, fast, and cost effective because the anchor bolt fastener assembly does not extend above the surface grade of the slurry. As a result, automatic surface finishing machines can be used effectively.

Once the slurry is cured, construction walls and/or structural columns can be positioned over the anchor bolt fastener assembly disclosed herein without the difficulty of lifting the construction walls and/or structural columns over protruding threaded portions of the anchor bolts extending out of the concrete as in prior art designs. Mounting holes in the construction walls and/or structural columns can simply be aligned with the inner receiving chamber in the anchor bolt float and fastened using specialized fastener studs, which cooperate with the anchor bolt to secure the structures to the hardened slurry. The specialized fastener studs can include, but are not limited to, bolt-like fasteners with female ends with integrated compression washer features, bolt-like fasteners with female ends without integrated compression washer features, and/or loose compression washers.

BRIEF DESCRIPTION OF DRAWINGS

The drawings described herein are for illustrative purposes only of selected embodiments and not all possible implementations, and are not intended to limit the scope of the present disclosure.

Other advantages of the present invention will be readily appreciated, as the same becomes better understood by reference to the following detailed description when considered in connection with the accompanying drawings wherein:

FIG. 7 is a side section view of the exemplary compression washer shown in FIG. 4 taken along section line A-A in FIG. 4;

FIG. 8 is an enlarged partial right-side section view of a portion of the exemplary compression washer shown in circle B-B in FIG. 7;

FIG. 9 is an enlarged partial left-side section view of a portion of the exemplary compression washer shown in circle C-C in FIG. 7;

FIG. 10 is a side section view of an exemplary fastener stud of an anchor bolt fastener assembly constructed in accordance with the subject disclosure;

FIG. 11 is a side section view of the exemplary compression washer shown in FIG. 1 in a sub-assembly with the exemplary fastener stud shown in FIG. 10;

DETAILED DESCRIPTION

Figure 1:
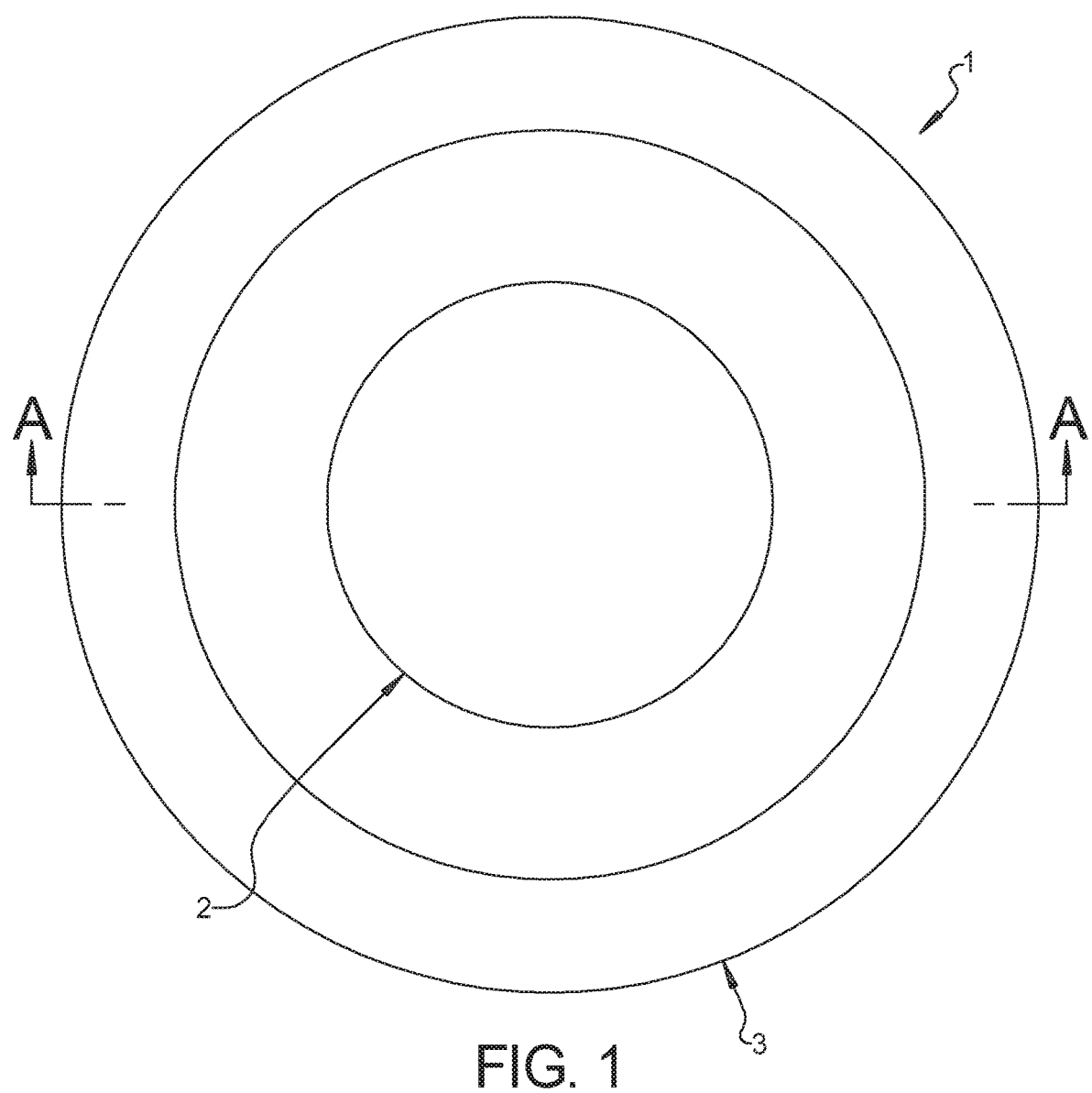
FIG. 1 is a top plan view of an exemplary compression washer of an anchor bolt fastener assembly constructed in accordance with the subject disclosure.

Referring to the Figures, wherein like numerals indicate corresponding parts throughout the several views, an anchor bolt fastener assembly is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
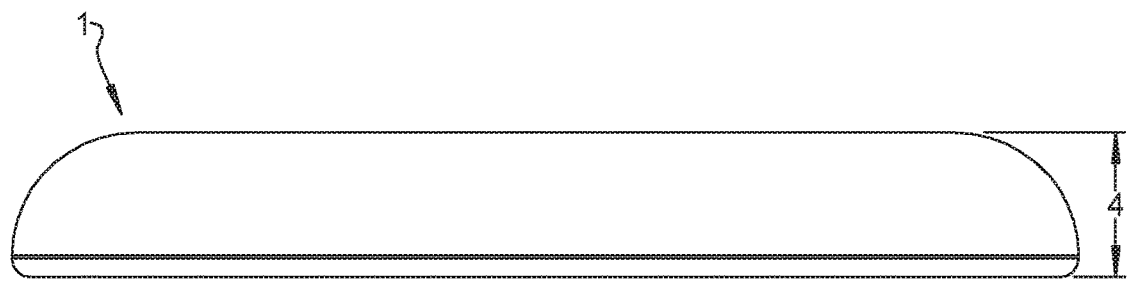
FIG. 2 is a side elevation view of the exemplary compression washer shown in FIG. 1.
Figure 3:
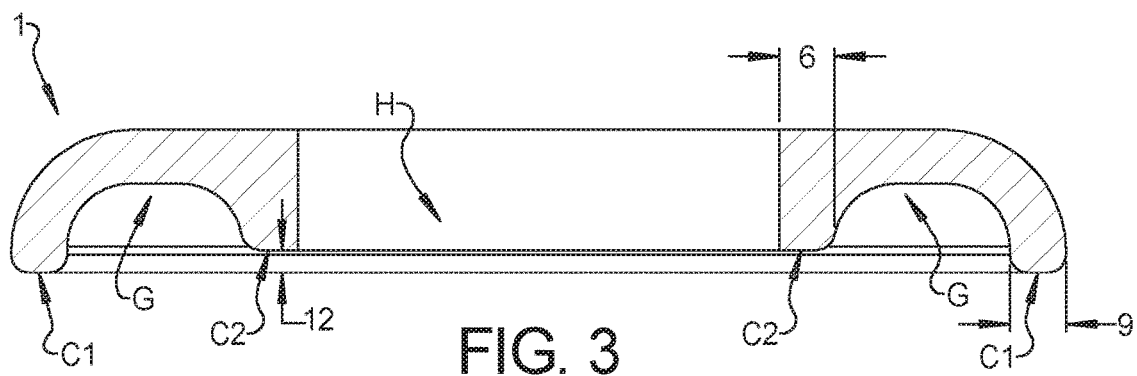
FIG. 3 is a side section view of the exemplary compression washer shown in FIG. 1 taken along section line A-A in FIG. 1.
Figure 4:
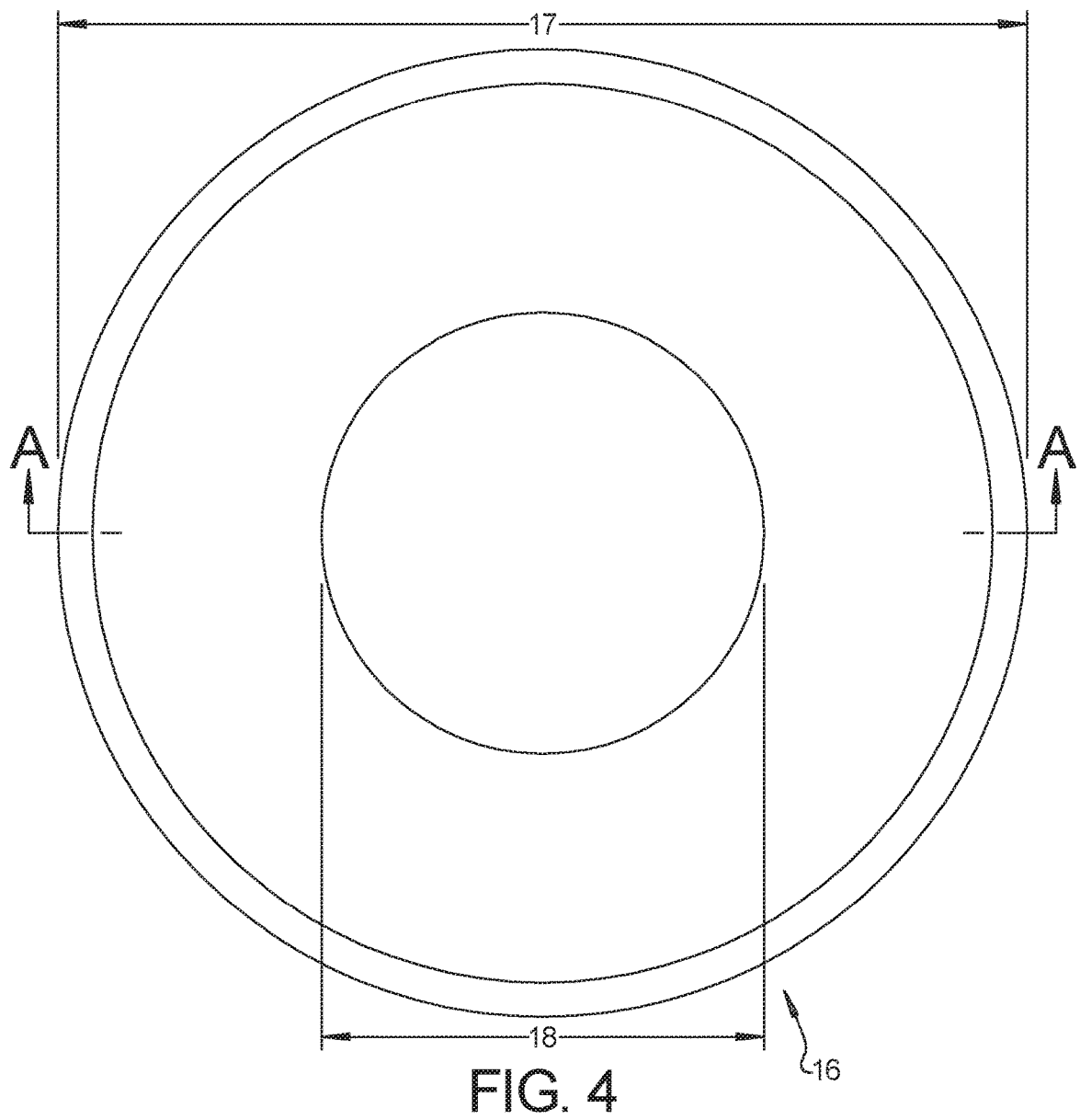
FIG. 4 is a top plan view of another exemplary compression washer of an anchor bolt fastener assembly constructed in accordance with the subject disclosure.
Figure 5:
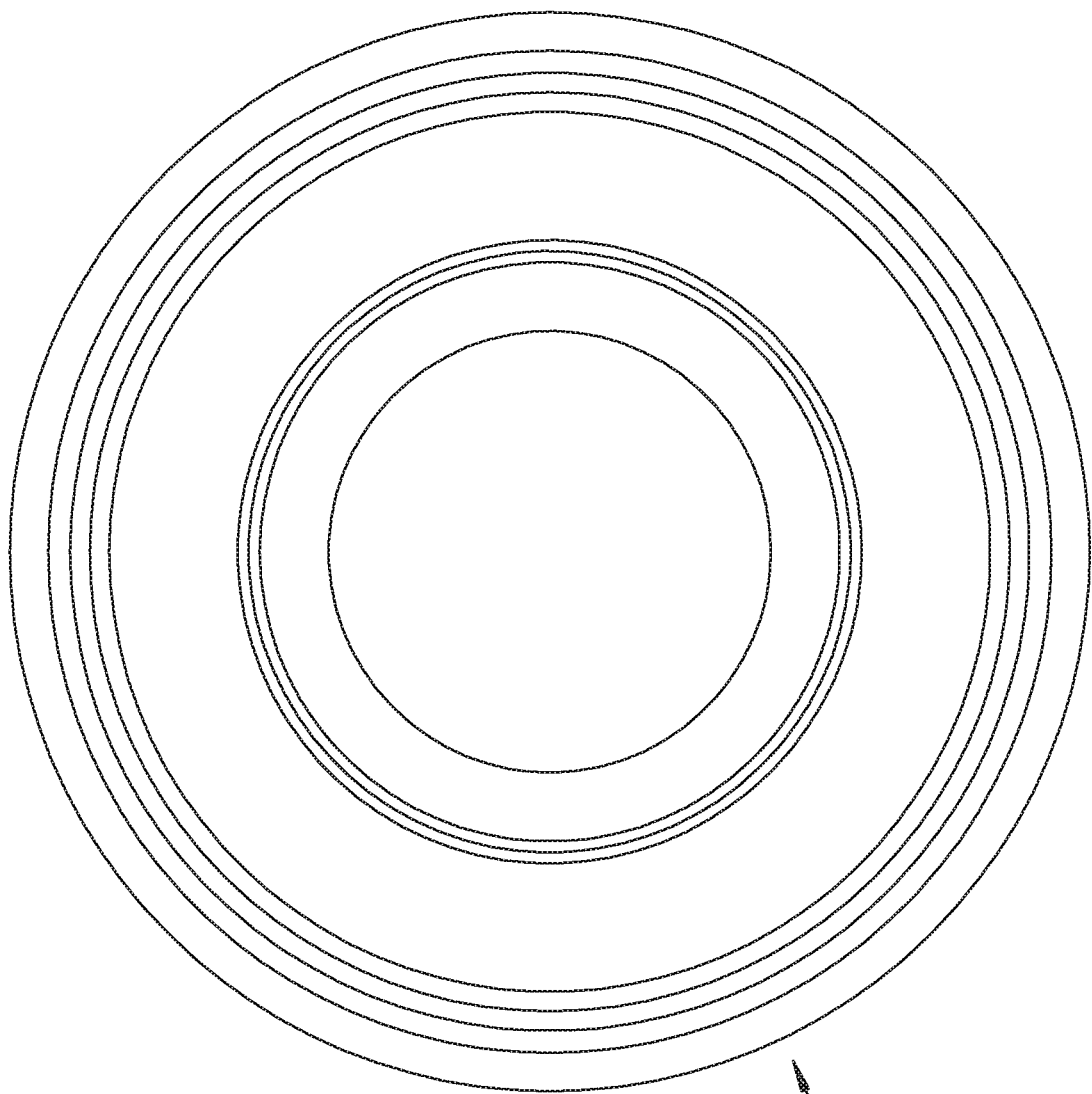
FIG. 5 is bottom plan view of the exemplary compression washer shown in FIG. 4.
Figure 6:
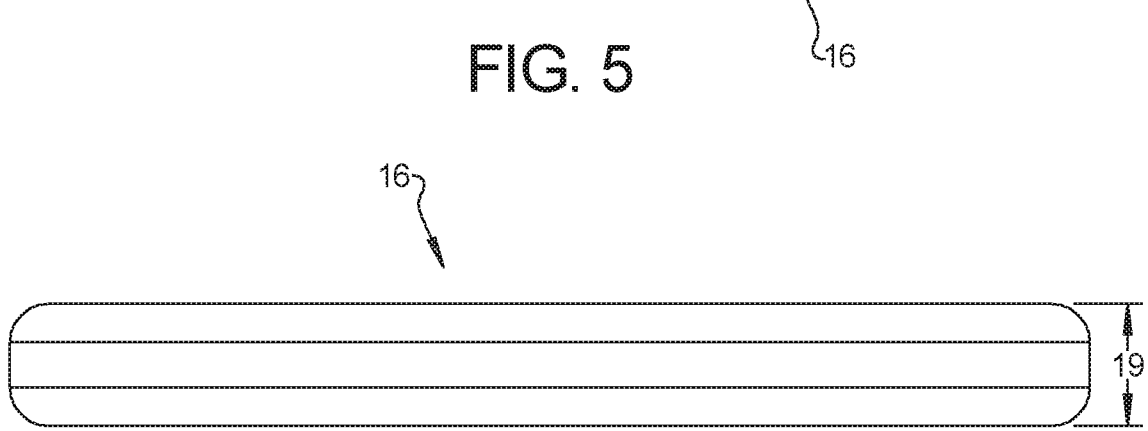
FIG. 6 is a side elevation view of the exemplary compression washer shown in FIG. 4.

Referring to FIGS. 1-3, a first exemplary embodiment of a compression washer 1 for an anchor bolt fastener assembly is illustrated. The compression washer 1 has an inside diameter 2, an outside diameter 3, and an overall thickness 4. The inside diameter 2 defines a center hole H in the compression washer 1. The compression washer 1 has a rounded profile at the outside diameter 3. The underside of compression washer 1 has an annular groove G positioned radially between the inside diameter 2 and the outside diameter 3. The compression washer 1 has a reduced thickness at the annular groove G, which creates a first compression surface C1 with a radial width 9 and a second compression surface C2 with a radial width 6. The first compression surface C1 is positioned radially between the outside diameter 3 and the annular groove G, while the second compression surface C2 is positioned radially between the inside diameter 2 and the annular groove G. The second compression surface C2 is inset or recessed in the compression washer 1 relative to the first compression surface C1 by a recessed distance 12.

Figure 12:
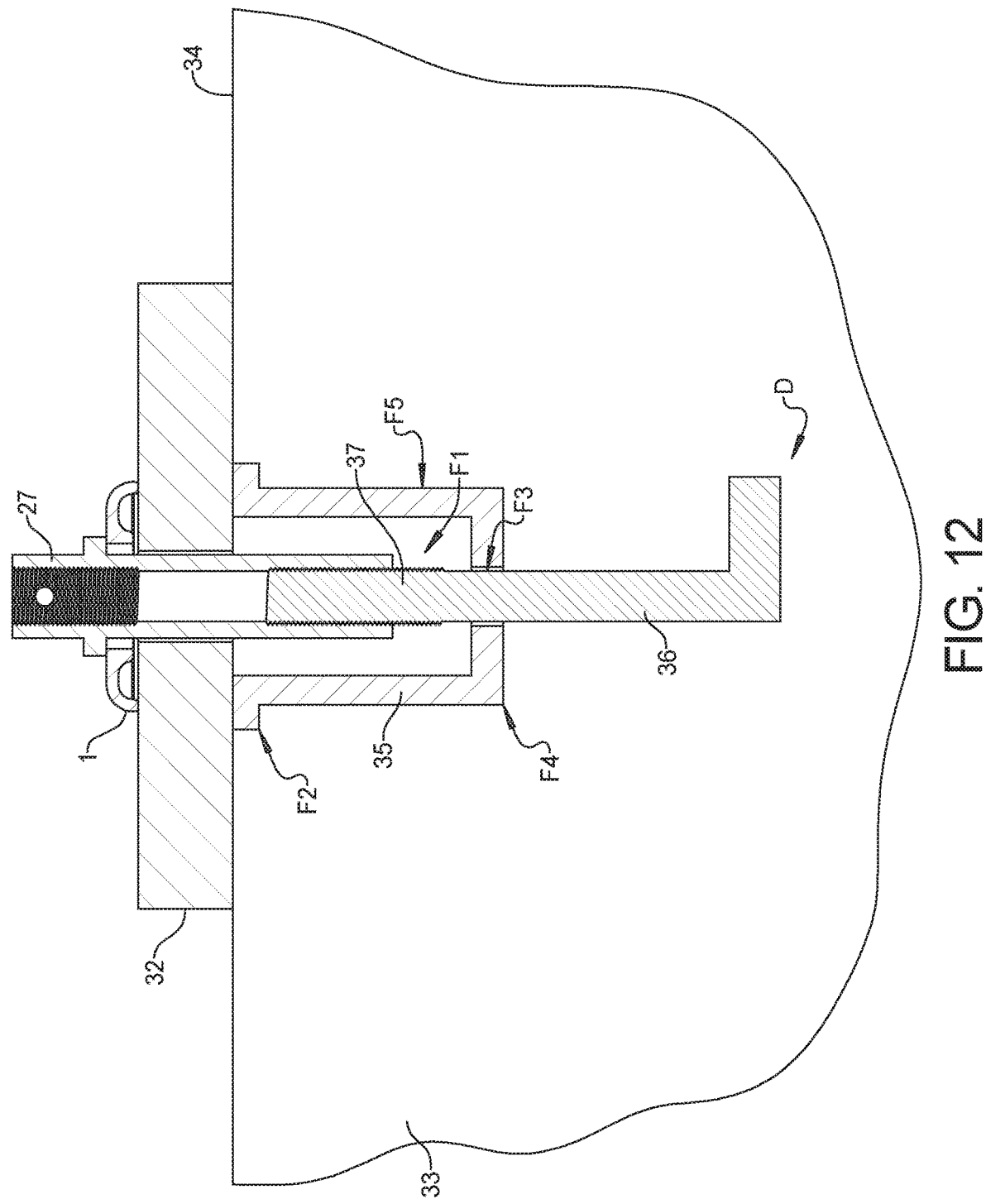
FIG. 12 is a side section view of an exemplary anchor bolt fastener assembly constructed in accordance with the subject disclosure, where the exemplary anchor bolt fastener assembly is shown securing a typical wood frame structure to a concrete slurry foundation.

During assembly, the first compression surface C1 makes initial contact with a bottom plate 32 of a wall construction (not shown) or similar structural building component (see FIG. 12). As compressive fastening forces increase, the compression washer 1 begins to flex such that recessed distance 12 is reduced. As compressive fastening forces approach maximum levels, the second compression surface C2 is brought into contact with the bottom plate 32 of the wall construction or similar structural building component.

Referring to FIGS. 4-9, a second exemplary embodiment of a compression washer 16 for an anchor bolt fastener assembly is illustrated. The compression washer 16 has an outside diameter 17, an inside diameter 18, and an overall thickness 19. The inside diameter 18 defines a center hole H in the compression washer 16. The compression washer 16 has beveled outer edges 24 at the outside diameter 17. The underside of compression washer 16 has an annular groove G positioned radially between the inside diameter 18 and the outside diameter 17. The compression washer 16 has a reduced thickness at the annular groove G, which creates a first compression surface C1 and a second compression surface C2. The first compression surface C1 is positioned radially between the outside diameter 17 and the annular groove G, while the second compression surface C2 is positioned radially between the inside diameter 18 and the annular groove G. The second compression surface C2 is inset or recessed in the compression washer 16 relative to the first compression surface C1 by a recessed distance 20.

The radii of outer edges 24 are greater than the radii of center edges 26 and the radii of the center edges 26 are greater than the radii of the inner edges 25. The relationship of the radii of edges 24, 25, and 26 is expressed by Equation I, below:

Outer Radii>Center Radii>Inner Radii         Equation I

Referring to FIG. 10, a section view of an exemplary embodiment of a specialized fastener stud 27 is illustrated with a first threaded end 31 and a second threaded end 30. In some exemplary examples of the specialized fastener stud 27, the first threaded end 31 may not have the same thread size as the second threaded end 30. The fastener stud 27 includes a shank 29 that is cylindrical in shape with a through-bore B at the center. A flange-stop 28 extends radially outwardly from the shank 29 close to the second threaded end 30. The shank 29 can be as much as three fourths of the total length of the fastener stud 27 between the flange-stop 28 and first threaded end 31.

An inspection hole 40 is provided in fastener stud 27 adjacent to the second threaded end 30. The inspection hole 40 provides a method of visual confirmation of proper thread engagement when an optional threaded component (not shown) is threaded into the second threaded end 30 of the fastener stud 27. The inspection hole 40 also provides a method of inserting a probe into the through-bore B for physical confirmation of proper thread engagement when the threaded component is fastened into the second threaded end 30. By way of example and without limitation, the threaded component that is threaded into the second threaded end 30 of the fastener stud 27 may be a threaded fastener, such as a bolt.

Referring to FIG. 11, a sub-assembly is shown where the specialized fastener stud 27 is assembled with the compression washer 1. To form this sub-assembly, the shank 29 of the fastener stud 27 is inserted through the center hole H in the compression washer 1. The compression washer 1 is slid up the shank 29 until the compression washer 1 makes contact with the flange-stop 28 of the fastener stud 27. As shown in FIG. 12, the sub-assembly is further assembled with a wood bottom plate 32 of a wall construction (not shown) and an anchor bolt float 35.

The anchor bolt float 35 includes a threaded bore F3 in a first end F4 of the anchor bolt float 35, an inner receiving chamber F1 that is open to a second end F2 of the anchor bolt float 35, and an outer slurry contact surface F5 disposed between the first and second ends F2, F4. When the anchor bolt float 35 is embedded in concrete slurry 33, the second end F2 is configured to be generally oriented relatively flush with the top surface 34 (i.e., grade) of the concrete slurry 33, while the first end F4 is configured to be generally submerged deep below the surface of the concrete slurry 33.

Anchor bolt 36 is embedded in the concrete slurry 33. The anchor bolt 36 includes a threaded portion 37, which screws into the threaded bore F3 in the anchor bolt float 35, and a tail portion D that has an L-shape. The threaded portion 37 of the anchor bolt 36 protrudes into the inner receiving chamber F1 of the anchor bolt float 35, which receives the first threaded end 31 of the fastener stud 27. The threaded portion 37 of the anchor bolt 36 screws into the first threaded end 31 of the fastener stud 27 completing a threaded connection. The wood bottom plate 32 is secured to the top surface 34 of the concrete slurry 33 by the fastener stud 27 and the compression washer 1. It should be appreciated that in a different embodiment, compression washer 16 can be substituted for compression washer 1. It should also be appreciated that other construction elements, such as a beam, could be substituted for the wood bottom plate 32 and that other orientations are possible where surface 34 of the concrete 33 is vertical, at an angle, or is a bottom or side surface instead of a top surface.

Figure 13:
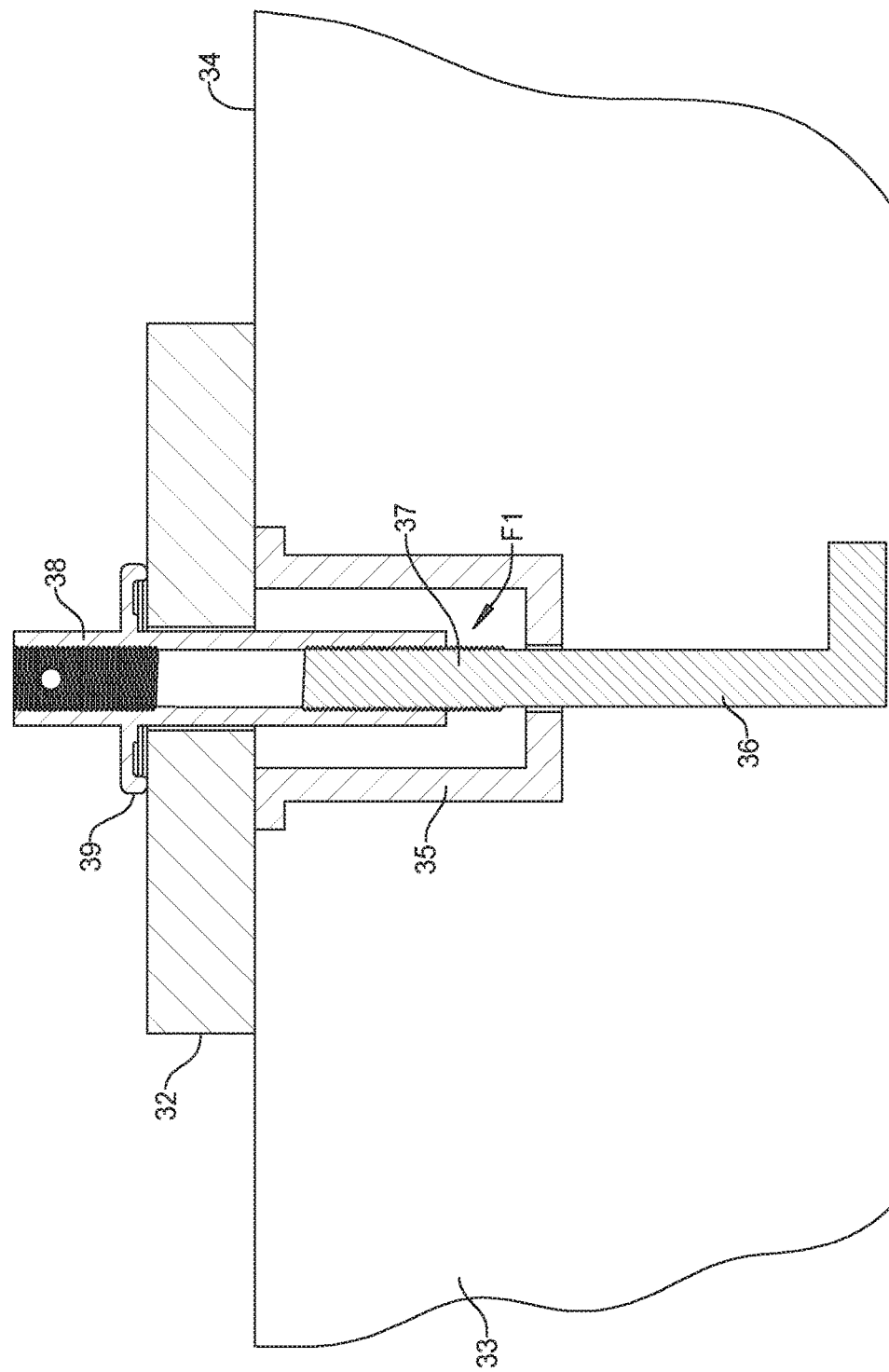
FIG. 13 is a side section view of another exemplary anchor bolt fastener assembly constructed in accordance with the subject disclosure, where the exemplary anchor bolt fastener assembly is shown securing a typical wood frame structure to a concrete slurry foundation.

Referring to FIG. 13, a sub-assembly is shown that includes a different specialized fastener stud 38 with an integral compression washer 39. In accordance with this design, the flange-stop 28 of fastener stud 27 and the compression washer 1 are replaced by the integral compression washer 39, which is part of fastener stud 38. The fastener stud 38 extends through the wood bottom plate 32 of the wall construction (not shown) and is received by the inner receiving chamber F1 of the anchor bolt float 35. The anchor bolt 36 is embedded in the concrete slurry 33 and the wood bottom plate 32 is secured to the top surface 34 of the concrete slurry 33 by the fastener stud 38, which is coupled to the threaded portion 37 of the anchor bolt 36.

A construction connection method for attaching a building component 32 to hardened concrete slurry 33 is also provided. The method further comprises the steps of: threading the anchor bolt 36 into the first end F4 of the anchor bolt float 35 and embedding the anchor bolt 36 and the anchor bolt float 35 in the concrete slurry 33 before the concrete slurry is cured such that the second end F2 of the anchor bolt float 35 is flush with the top surface 34 of the concrete slurry 33. The method further includes the steps of: sliding the compression washer 1 over the shank 29 of the fastener stud 27, placing the building component 32 over the anchor bolt float 35, inserting the shank 29 of the fastener stud 27 into a hole provided in the building component 32, inserting the first threaded end 31 of the fastener stud 27 into the inner receiving chamber F1 of the anchor bolt float 35, and threading the first threaded end 31 of the fastener stud 27 to the threaded portion 37 of the anchor bolt 36.

The method continues with the steps of: providing the compression washer 1 with a first compression surface C1 and a second compression surface C2 and tightening the fastener stud 27 relative to the anchor bolt 36 to apply a compressive force to the compression washer 1 so that the compression washer 1 flexes allowing the second compression surface C2 to make contact with the building component 32. It should be understood that the term "building component" is simply used to refer to structural components or members used to build a structure and therefore, can be, but is not limited to, components used in buildings.

The method also comprises the steps of: inserting a threaded component (not shown) into the second threaded end 30 of the fastener stud 27, providing an inspection hole 40 in the fastener stud 27, and viewing the threaded component through the inspection hole 40 to confirm that the threaded component has been inserted to a proper threaded depth. The method may also optionally include the step of inserting a probe (not shown) through the inspection hole 40 to confirm proper threaded insertion depth.

It should be appreciated that although the steps of the methods are described and illustrated herein in a particular order, the steps may be performed in a different order without departing from the scope of the subject disclosure, except where the order of the steps is otherwise noted. In the same vein, it should be appreciated that the methods described and illustrated herein may be performed without the inclusion of all the steps described above or with the addition of intervening steps that have not been discussed, all without departing from the scope of the subject disclosure.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. An anchor bolt fastener assembly for securing a structural building component to hardened concrete slurry, said anchor bolt fastener assembly comprising:
   a fastener stud comprising a shank and a through-bore with a first threaded end;
   a compression washer extending annularly about said shank of said fastener stud;
   an anchor bolt float configured to be imbedded in the concrete slurry, said anchor bolt float extending between a first end and a second end comprising an inspection hole that allows an installer to confirm proper insertion length of a construction fastener inserted into said second threaded end;
   said first end of said anchor bolt float including a threaded bore; and
   said anchor bolt float comprising an inner receiving chamber that is open to said second end of said anchor bolt float and is configured to receive at least part of said fastener stud; and
   an anchor bolt comprising a tail portion configured to be embedded in the concrete slurry and a threaded portion that is threadably received in said threaded bore of said anchor bolt float such that at least part of said threaded portion of said anchor bolt extends into said inner receiving chamber of said anchor bolt float where said threaded portion of said anchor bolt is threadably received in said first threaded end of said fastener stud to couple said fastener stud to said anchor bolt.

2. The anchor bolt fastener assembly as set forth in claim 1, wherein said fastener stud has a second threaded end.

3. The anchor bolt fastener assembly as set forth in claim 2, wherein said first threaded end and said second threaded end of said fastener stud have the same thread size diameter.

4. The anchor bolt fastener assembly as set forth in claim 2, wherein said first threaded end and said second threaded end of said fastener stud have different thread size diameters.

5. The anchor bolt fastener assembly as set forth in claim 1, wherein said compression washer includes a center hole with an inside diameter, an outside diameter, and an annular groove positioned radially between said inside diameter and said outside diameter.

6. The anchor bolt fastener assembly as set forth in claim 5, wherein said compression washer has a first compression surface that is positioned radially between said outside diameter and said annular groove and a second compression surface that is positioned radially between said inside diameter and said annular groove.

7. The anchor bolt fastener assembly as set forth in claim 6, wherein said compression washer has an outer pair of radii at said outside diameter, a center pair of radii between said first compression surface and said annular groove, and an inner pair of radii between said second compression surface and said annular groove.

8. The anchor bolt fastener assembly as set forth in claim 7, wherein the relative size of the respective radii is expressed by the equation: outer radii>center radii>inner radii.

9. The anchor bolt fastener assembly as set forth in claim 6, wherein said second compression surface is inset relative to said first compression surface by a recessed distance.

10. The anchor bolt fastener assembly as set forth in claim 1, wherein said second end of said anchor bolt float is configured to be flush with a surface of the concrete slurry and wherein said fastener stud extends through a hole in the structural building component such that the structural building component is positioned between said second end of said anchor bolt float and said compression washer.

11. The anchor bolt fastener assembly as set forth in claim 10, wherein the structural building component is one of a wood bottom plate of a wall construction or a structural beam.

12. The anchor bolt fastener assembly as set forth in claim 1, wherein said anchor bolt float includes an outer slurry contact surface that extends from said first end of said anchor bolt float to said second end of said anchor bolt float that prevents the concrete slurry from entering said inner receiving chamber of said anchor bolt float.

13. The anchor bolt fastener assembly as set forth in claim 1, wherein said compression washer is a separate component from said fastener stud and is retained by a flange-stop that extends radially outwardly from said shank of said fastener stud.

14. The anchor bolt fastener assembly as set forth in claim 1, wherein said compression washer is an integral portion of said fastener stud.

15. The anchor bolt fastener assembly as set forth in claim 1, wherein said tail portion of said anchor bolt has an L-shape.

16. The anchor bolt fastener assembly of claim 1, wherein said compression washer further comprises:
   a center hole with an inside diameter, an outside diameter, and an annular groove positioned radially between said inside diameter and said outside diameter;
   a first compression surface that is positioned radially between said outside diameter and said annular groove and a second compression surface that is positioned radially between said inside diameter and said annular groove;
   an outer pair of radii at said outside diameter, a center pair of radii between said first compression surface and said annular groove, and an inner pair of radii between said second compression surface and said annular groove, wherein
   the relative size of the respective radii is expressed by the equation: outer radii>center radii>inner radii and said second compression surface is inset relative to said first compression surface by a recessed distance.

* * * * *

UNITED STATES PATENT AND TRADEMARK OFFICE
CERTIFICATE OF CORRECTION

PATENT NO. : 10,697,173 B2
APPLICATION NO. : 16/036492
DATED : June 30, 2020
INVENTOR(S) : Drummond et al.

Page 1 of 1

It is certified that error appears in the above-identified patent and that said Letters Patent is hereby corrected as shown below:

In the Specification

In Column 1, Line 8, delete "2017 so that the" and insert --2017. The-- therefor In Column 1, Line 9, after "above", insert --referenced--

Signed and Sealed this
Sixth Day of October, 2020

Andrei Iancu
*Director of the United States Patent and Trademark Office*